United States Patent [19]

Miyoshi et al.

[11] Patent Number: 5,463,000
[45] Date of Patent: Oct. 31, 1995

[54] PROCESS FOR PRODUCING OLEFIN POLYMERS

[75] Inventors: Yoshihiro Miyoshi, Chiba; Hiroyuki Shiraishi, Sodegaura; Kiyoshi Kawai, Chiba; Hideaki Koga, Ichihara, all of Japan

[73] Assignee: Sumitomo Chemical Company, Limited, Osaka, Japan

[21] Appl. No.: 966,850

[22] Filed: Oct. 27, 1992

[30] Foreign Application Priority Data

Oct. 29, 1991 [JP] Japan ................... 3-282556

[51] Int. Cl.[6] .................................. C08F 4/656
[52] U.S. Cl. .............. 526/119; 526/125.1; 526/901; 526/904; 502/115
[58] Field of Search ................ 526/119, 124, 526/125, 128, 901, 904, 118

[56] References Cited

U.S. PATENT DOCUMENTS

| | | | |
|---|---|---|---|
| 4,748,221 | 3/1988 | Collomb et al. | 526/153 |
| 4,857,611 | 8/1989 | Durand et al. | 526/88 |
| 4,900,706 | 2/1990 | Sasaki et al. | 502/116 |
| 4,916,099 | 4/1990 | Sasaki et al. | 502/126 |
| 5,077,250 | 12/1991 | Miyoshi et al. | 526/119 |

FOREIGN PATENT DOCUMENTS

| | | |
|---|---|---|
| 598828 | 1/1989 | Australia. |
| 0252804 | 1/1988 | European Pat. Off.. |
| 0306939 | 3/1989 | European Pat. Off.. |
| 597201 | 3/1986 | U.S.S.R.. |

Primary Examiner—Romulo H. Delmendo
Attorney, Agent, or Firm—Stevens, Davis, Miller & Mosher

[57] ABSTRACT

A process for producing an olefin polymer which comprises homopolymerizing or copolymerizing an olefin in a gas phase by using a catalyst system comprising the following components A) and B):

A) a solid catalyst component prepared by immobilizing a catalyst component comprising at least titanium, magnesium, halogen and an electron-donative compound on a porous polymer material, said solid catalyst component satisfying the following conditions (a), (b) and (c):

(a) ethylene is preliminarily polymerized thereon in an amount of 50–200 g per gram of the component previously immobilized on the porous polymer material.

(b) the preliminary polymerization of ethylene is carried out at most at a rate of 3 g/g-immobilized component-hour at least until the quantity of the preliminarily polymerized ethylene reaches 5 g/g-immobilized component, and (c) the preliminarily polymerized ethylene polymer has an intrinsic viscosity [η] of 0.5 dl/g to 2.5 dl/g as measured in tetralin at 135° C.; and B) an organoaluminum compound.

Thus, an olefin polymer small in the extent of adhesion to polymerization reactor, small in the number of fish-eyes, low in the content of fine powder, high in bulk density and good in fluidity could be produced.

19 Claims, 1 Drawing Sheet

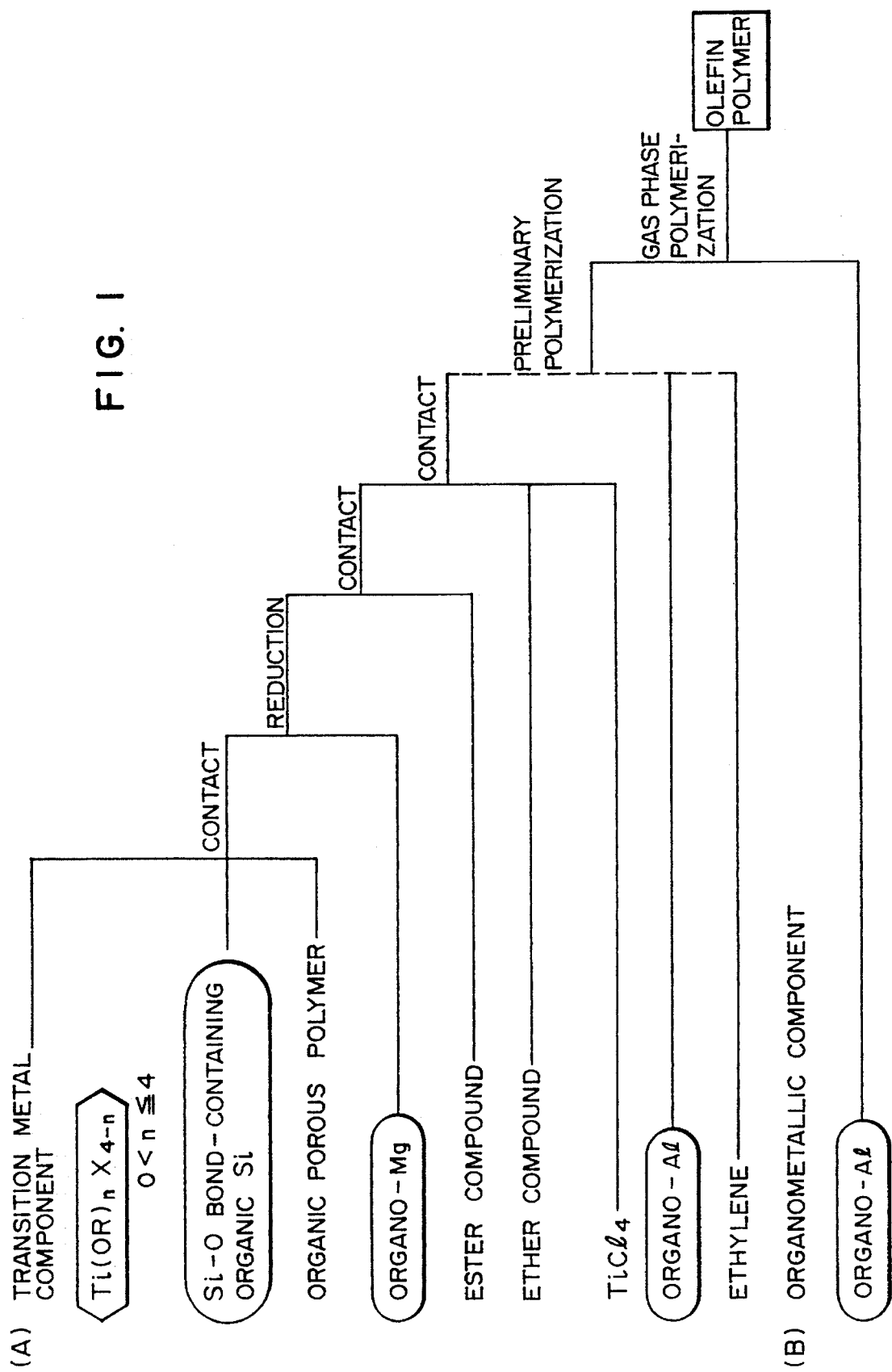

PROCESS FOR PRODUCING OLEFIN POLYMERS

BACKGROUND OF THE INVENTION

1. Field of the Invention

This invention relates to a process for producing an olefin polymer small in the content of fish-eye (the gel deteriorating the appearance of product processed and made into an article), high in bulk density, small in the content of fine powder and good in fluidity by using a solid catalyst component having a very high activity per transition metal in the gas phase polymerization process.

2. Description of the Related Art

Highness of the activity, particularly the activity per transition metal, of a catalyst (the quantity of polymer formed per unit quantity of catalyst) used in the production of olefin polymers is quite valuable industrially because such a catalyst makes it unnecessary to remove the catalyst residue from the polymer obtained by polymerization and can thereby simplify the production process. On the other hand, smallness in the extent of adhesion of formed polymer to polymerization reactor, highness in the bulk density of polymer powder, narrowness in the particle size distribution of polymer powder and goodness in the fluidity of polymer powder are desirable from the viewpoint of stability and efficiency of operation. From the viewpoint of quality of product, as small a number of fish-eye as possible is desired because it deteriorates the appearance and properties of processed articles.

In the recent years, a number of reports have been published concerning the fact that a solid catalyst component comprising a magnesium compound and a titanium compound can function as an excellent high-activity polymerization catalyst for olefins (for example, Japanese Patent Application KOKOKU Nos. 50-30102, 57-24361, Japanese Patent Application KOKAI No. 61-296007, etc.). However, if an olefin is polymerized in gas phase by using these high-activity Ziegler catalysts, a large quantity of heat is generated at the time of polymerization which makes the resulting polymer into a bulky mass and makes difficult the progress of polymerization.

As a method for preventing the formation of bulky polymer, methods which comprise preliminarily polymerizing ethylene and/or α-olefin and thereafter polymerizing olefin in gas phase is known (for example, Japanese Patent Application KOKAI Nos. 48-45284, 59-30806, Japanese Patent Application KOKOKU Nos. 52-45749, 60-26407, 61-9964, 64-10532, Japanese Patent Application KOHYO No. 61-502061, etc.). However, these methods are yet unsatisfactory in the particle characteristics of the resulting powdery polymer.

On the other hand, with the aim of improving the particle characteristics of the resulting powdery polymer, there have been disclosed methods which comprise impregnating a porous inorganic carrier with catalyst components (for example, Japanese Patent Application KOKOKU No. 61-26805, Japanese Patent Application KOKAI Nos. 56-24409, 58-179209, etc.). However, it cannot be said that a polymer powder good in fluidity and high in bulk density or a polymer giving a molded film small in the content of fish-eye can be obtained by these methods.

With the aim of solving these problems, there have been disclosed methods which comprise impregnating a porous carrier with catalyst components and preliminarily polymerizing ethylene thereon (for example, Japanese Patent Application KOKAI Nos. 61-87703, 64-16804, 1-261404, 3-72509, etc.). However, these methods are yet unsatisfactory in the points of particle characteristics and fish-eye.

Apart from the above, there are known methods of preliminarily polymerizing an α-olefin (for example, Japanese Patent Application KOKOKU No. 63-46084, Japanese Patent Application KOKAI Nos. 59-184207, 2-51505, etc.). However, these methods are undesirable because they have a problem concerning the adhesion of polymer powder to the preliminary polymerization-reactor, etc.

SUMMARY OF THE INVENTION

In view of the above-mentioned circumstances, an object of this invention is to provide a process for producing an olefin polymer small in the extent of adhesion of polymer to the polymerization reactor, small in the quantities of fish-eye and fine powder, high in the bulk density and excellent in the fluidity by using a catalyst which is high in the catalytic activity per transition metal enough to make the removal of the catalyst residue unnecessary, good in the particle characteristics and prepared by preliminarily polymerizing a specified quantity of ethylene thereon.

According to this invention, there is provided a process for producing an olefin polymer which comprises homopolymerizing or copolymerizing an olefin in a gas phase by using a catalyst comprising the following components A) and B):

A) a solid catalyst component prepared by immobilizing a catalyst component comprising at least titanium, magnesium, halogen and an electron-donative compound on a porous polymer material, said solid catalyst component satisfying the following conditions (a), (b) and (c):

(a) ethylene is preliminarily polymerized in an amount of 50–200 g per gram of the component previously immobilized on the porous polymer material (hereinafter, said component is sometimes referred to as "immobilized component"), (b) the preliminary polymerization of ethylene is carried out at most at a rate of 3 g/g-immobilized component/hour at least until the quantity of the preliminarily polymerized ethylene reaches 5 g/g-immobilized component, and (c) the preliminarily polymerized ethylene polymer has an intrinsic viscosity [η] of 0.5 dl/g to 2.5 dl/g as measured in tetralin at 135° C.; and B) an organoaluminum compound.

According to one preferable embodiment of this invention, the process of this invention uses a solid catalyst component which is a trivalent titanium-containing solid catalyst component represented by the following composition formula:

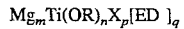

$$Mg_m Ti(OR)_n X_p [ED]_q$$

wherein R is a hydrocarbon group having 1–20 carbon atoms, X is halogen, ED is an electron-donative compound, and m, n, p and q are numbers satisfying $1 \leq m \leq 51$, $0 < n \leq 5$, $5 \leq p \leq 106$ and $0.2 \leq q \leq 2$, respectively, said solid catalyst component being prepared by reducing a titanium compound represented by the following general formula:

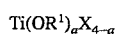

$$Ti(OR^1)_a X_{4-a}$$

wherein $R^1$ is a hydrocarbon group having 1–20 carbon atoms, X is halogen atom and a is a number satisfying $0 < a \leq 4$, with an organomagnesium compound in the presence of an organic silicon compound having Si—O bond and a porous polymer to obtain a solid product, treating the solid product with an ester compound, and then reacting the treated product with titanium tetrachloride or a mixture of titanium tetrachloride and an electron-donative compound.

BRIEF DESCRIPTION OF THE DRAWINGS

FIG. 1 is a flow chart facilitating understanding of this invention. The flow chart diagram is nothing other than a typical exmaple of the embodiments of this invention, and this invention is by no means limited thereby.

DESCRIPTION OF THE PREFERRED EMBODIMENTS

Next, this invention will be explained below more concretely.

The catalyst component used in this invention is prepared by immobilizing a catalyst component at least magnesium, titanium, halogen and an electron-donative compound as indispensable components on a porous polymer material. The catalyst component may additionally contain organic functional components such as alkoxy group, aryloxy group, acyloxy group, alkylamino group and the like, metals such as boron, aluminum, silicon, calcium, zinc and the like, or inorganic compounds thereof.

According to the studies of the present inventors, the mean particle diameter of the solid catalyst component is an important factor for the production of a copolymer having good particle characteristics. Thus, the mean particle diameter should be 5 to 300 μm, and preferably 10–250 μm. If the mean particle diameter is smaller than 5 μm, the polymer particle increases its adhesive force, and in the case of using a fluidized bed type gas phase reactor, there arises the problem of flying of catalyst and polymer particles. On the other hand, if the mean particle diameter is greater than 300 μm, the minimum fluidizing velocity in a fluidized bed type gas phase reactor remarkably increases to make it difficult to achieve a stable fluidized state, as a result of which the polymer particles form a bulky mass.

Said catalyst component will be explained below more concretely.

As the porous polymer material of this invention, any known ones may be used. They include polystyrene type, polyacrylic ester type, polymethacrylic ester type, polyacrylonitrile type, polyvinyl chloride type and polyolefin type of porous organic polymers. Typical examples thereof include polystyrene, styrene-divinylbenzene copolymer, styrene-N, N'-alkylene-dimethacrylamide copolymer, styrene-ethylene glycol-dimethyl methacrylate copolymer, polymethyl acrylate, polyethyl acrylate, methyl acrylate-divinylbenzene copolymer, ethyl acrylate-divinylbenzene copolymer, polymethyl methacrylate, methyl methacrylate-divinylbenzene copolymer, polyethylene glycol dimethyl methacrylate, polyacrylonitrile, acrylonitrile-divinylbenzene copolymer, polyvinyl chloride, polyvinylpyrrolidine, polyvinylpyridine, ethylvinylbenzene-divinylbenzene copolymer, polyethylene, ethylene-methyl acrylate copolymer, polypropylene and the like.

Among these porous organic polymers, polystyrene type, polyvinyl chloride type, polyolefin type and polyacrylonitrile type of porous polymer beads are preferably used, and styrene-divinylbenzene copolymer and acrylonitrile-divinylbenzene copolymer are more preferably used, and styrene-divnylbenzene copolymer is particularly preferably used.

In said porous polymer material, the pore volume in the pore radius range of 100 to 5,000 Angstroms is 0.1 ml/g or above, and preferably 0.3 ml/g or above. Further, the ratio of the pore volume in the above-mentioned pore radius to the pore volume in the pore radius range of 35 to 75,000 Angstroms is 35% or above, and preferably 40% or above. If pore volume of the porous polymer material is too small, the catalyst component cannot be immobilized effectively. Even if the pore volume of the porous polymer material is 0.1 ml/g or above, the catalyst component cannot be immobilized effectively unless the pores are those of which pore radius falls in a range of 100 to 5,000 Angstroms. A porous polymer material not satisfying this condition cannot give an effective catalyst for olefin polymerization.

The mean particle diameter of the porous polymer material is 5 to 300 μm, and preferably 10 to 250 μm. The geometrical standard deviation ($\sigma_g$) of the particle size distribution is 2.0 or below, and preferably 1.8 or below. If the mean particle diameter is smaller than the above-mentioned range, the polymer particle increases its adhesive force, and in the case of fluidized bed type reactor, the problem of flying of catalyst and polymer particles arises. On the other hand, if the mean particle diameter is greater than the above-mentioned range, the minimum fluidizing velocity in 10 fluidized bed type reactor remarkably increases to make it difficult to achieve a stable fluidized state, and the polymer particles form a bulky material.

The geometrical standard deviation $\sigma_g$ of particle size distribution is calculated according to the equation:

$$\sigma_g = D_g/D_p$$

based on an assumption that the particle size distribution can be expressed by the logarithmic probability distribution formula, wherein $D_g$ is the particle diameter of a fraction of which cumulative percentage by weight is 50% and $D_p$ is the particle diameter of a fraction of which cumulative percentage by weight is 15.8%.

When $\sigma_g$ is greater than the above-mentioned range, there arises a problem that a fine powdery polymer or polymer particles of great particle size are formed.

Further, this invention makes it possible to produce polymer particles low in the content of fine powdery polymer and having no problem from the viewpoint of moldability, owing to the use of a solid catalyst component having a specified mean particle diameter and a specified particle size distribution.

Next, the catalyst component comprising at least titanium, magnesium, halogen and an electron-donative compound to be immobilized on the porous polymer material will be explained concretely.

In the catalyst component of this invention, the atomic ratio of titanium/magnesium is 0.02 to 1.0 and preferably 0.05 to 0.2; the atomic ratio of halogen/magnesium is 1.8 to 10 and preferably 2.0 to 5.0; and the molar ratio of electron-donative compound/titanium is 0.1 to 5 and preferably 0.2 to 2.

As the method for producing said catalyst component, there are the methods disclosed in Japanese Patent Application KOKOKU No. 58-21922, Japanese Patent Application KOKAI No. 59-126402, Japanese Patent Application KOKOKU No. 35-459, Japanese Patent Application KOKAI No. 46-4393, Japanese Patent Application KOKOKU No. 46-31330, Japanese Patent Application KOKAI No. 47-42283, Japanese Patent Application KOKAI No. 49-86483, Japanese Patent Application KOKOKU No. 57-24361, Japanese Patent Application KOKAI No.

61-218606, Japanese Patent Application KOKOKU Nos. 39-12105, 43-13050, 46-34092, 46-34098, 47-41676, 55-23561, etc.

Next, as the method for immobilizing the catalyst component on the porous polymer material, mechanical methods such as pulverization and the like or chemical methods in the state of a slurry and the like are adopted. Among them, chemical methods are preferable from the viewpoint of particle characteristics.

As concrete examples of such methods, there can be applied the methods disclosed in Japanese Patent Application KOKAI Nos. 52-42585, 54-148093, 56-47407, 59-230006, 61-37803, 62-256802, 63-289004, 1-115909, 3-72509, etc. which comprise impregnating a porous material such as silica gel or the like with the catalyst component.

More specific examples of these methods include the following:

(1) a method which comprises treating a porous polymer material with an organomagnesium compound such as a Grignard reagent or the like and thereafter treating it with titanium tetrachloride or the like;

(2) a method which comprises treating a porous polymer material with an organomagnesium compound such as a Grignard reagent or the like, then reacting it with a halogenating agent and/or an alcohol and thereafter treating it with a titanium compound such as titanium tetrachloride;

(3) a method which comprises dissolving a magnesium halide compound and/or an alkoxymagnesium compound in a donor such as an alcohol, an ether or the like, forming it into a complex with titanium tetrachloride or the like and thereafter impregnating a porous polymer material with the complex;

(4) a method which comprises dissolving a magnesium halide compound and/or an alkoxymagnesium compound in a donor such as an alcohol, an ether or the like, impregnating a porous polymer material with the solution, and thereafter treating it with a titanium compound such as titanium tetrachloride or the like;

(5) a method which comprises reducing an alkoxytitanium compound with an organomagnesium compound such as a Grignard reagent or the like in the presence of a porous polymer material and thereafter treating the reduced product with a mixture of an ether compound and titanium tetrachloride; etc.

Among these methods, method (5) is preferable, and a method which comprises reducing an alkoxytitanium compound with an organomagnesium compound such as a Grignard reagent or the like in the presence of an organic silicon compound having Si—O bond and a porous polymer material to obtain a solid product, treating the solid product thus obtained with an ester compound, and thereafter treating it with a mixture of an ether compound and titanium tetrachloride is more preferable.

The quantity of the catalyst component to be immobilized on the porous polymer material is 1 to 70% by weight, preferably 3 to 60% by weight and particularly preferably 5 to 55% by weight, as expressed in terms of its content in the solid catalyst component. If the quantity of the catalyst component immobilized on the porous polymer material is too large, the particle characteristics of the polymer formed are deteriorated. If it is too small, the activity per solid catalyst component decreases.

The titanium compound used in the synthesis of the catalyst component used in this invention is represented by the following general formula:

$$Ti(OR^1)_a X_{4-a}$$

wherein $R^1$ is a hydrocarbon group having 1–20 carbon atoms, X is halogen atom, and a is a number satisfying $0 < a \leq 4$.

Concrete examples of $R^1$ include alkyl groups such as methyl, ethyl, propyl, iso-propyl, butyl, iso-butyl, amyl, iso-amyl, hexyl, heptyl, octyl, decyl, dodecyl and the like; aryl groups such as phenyl, cresyl, xylyl, naphthyl and the like; cycloalkyl groups such as cyclohexyl, cyclopentyl and the like; allyl groups such as propenyl and the like; aralkyl groups such as benzyl and the like; etc.

Among the above-mentioned groups, alkyl groups having 2 to 18 carbon atoms and aryl groups having 6 to 18 carbon atoms are preferable, and straight chain alkyl groups having 2 to 18 carbon atoms are particularly preferable. It is also possible to use titanium compounds having two or more different $OR^1$ groups.

Examples of the halogen atom include chlorine, bromine, iodine and the like, among which chlorine gives a particularly good result.

More concretely speaking, preferable examples of the titanium compound include ethoxytitanium trichloride, butoxytitanium trichloride, phenoxytitanium trichloride, dibutoxytitaniumdichloride, diphenoxytitanium dichloride, tributoxytitanium chloride, tetraethoxytitanium, tetrabutoxytitanium, tetraphenoxytitanium and the like.

The value of a is preferably $2 \leq a \leq 4$ and particularly $a=4$.

As a magnesium compound, the following ones can be used.

The preferable examples of the compound having a magnesium-carbon bond or a magnesium-hydrogen bond and having a reducing ability include diethylmagnesium, dibutylmagnesium, dihexylmagnesium, ethylmagnesium chloride, butylmagnesium chloride, hexylmagnesium chlroide, butylethoxymagnesium, butylmagnesium halide and the like. These magnesium compounds may be used in the form of a complex compound with an organoaluminum compound, if desired. On the other hand, preferable examples of the magnesium compound having no reducing ability include magnesium dihalides such as magnesium dichloride, magnesium dibromide and the like, alkoxymagnesium compounds such as methoxymagnesium chloride, ethoxymagnesium chloride, butoxymagnesium chloride, phenoxymagnesium chloride, diethoxymagnesium, dibutoxymagnesium, diphenoxymagnesium and the like, magnesium carboxylates such as magnesium laurate, magnesium stearate and the like.

As the magnesium compound having no reducing ability, those synthesized in advance from an organomagnesium compound such as Grignard reagent or the like according to the known methods or at the time of preparing the solid catalyst may also be used.

When an organoaluminum compound is used as the reducing reagent, organoaluminum compounds represented by the following general formula:

$$AlR^2_c Y_{3-c}$$

wherein $R^2$ is a hydrocarbon group having 1–20 carbon atoms, Y is a halogen atom, and c is a number satisfying $1 \leq c \leq 3$, can be used.

Their concrete examples include ethylaluminum sesquichloride, dimethylaluminum chloride, diethylaluminum chloride, di-n-propylaluminum chloride, trimethylaluminum, triethylaluminum, triisobutylaluminum, ethyldicyclohexylaluminum, triphenylaluminum, diethylaluminum hydride, diisobutylaluminum hydride, diethylaluminum bromide, diethylaluminum iodide and the like.

Concrete examples of the organic silicon compound include the followings:

tetramethoxysilane, dimethyldimethoxysilane, tetraethoxysilane, triethoxyethylsilane, diethoxydiethylsilane, ethoxytriethylsilane, tetra-iso-propoxysilane, di-iso-propoxy-di-iso-propylsilane, tetrapropoxysilane, dipropoxydiproipylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane, phenylhydropolysiloxane, and the like.

Among these organic silicon compounds, alkoxysilane compounds represented by general formula $Si(OR^8)_b R^9_{4-b}$ are preferable, and those wherein $1 \leq b \leq 4$ are more preferable, and tetraalkoxysilane compounds wherein $b=4$ are particularly preferable.

The electron-donative compound used in this invention include alcohols, ethers, esters and the like.

As the alcohol, alcohols having 1–18 carbon atoms such as methanol, ethanol, propanol, pentanol, hexanol, octanol, 2-ethylhexanol, dodecanol, octadecyl alcohol, benzyl alcohol, phenylethyl alcohol, cumyl alcohol, isopropylbenzyl alcohol and the like are preferable.

As the ether compound, dialkyl ethers such as diethyl ether, dipropyl ether, diisopropyl ether, dibutyl ether, diamyl ether, di-iso-amyl ether, di-neopentyl ether, dihexyl ether, dioctyl ether, methyl butyl ether, methyl iso-amyl ether, ethyl iso-butyl ether and the like are preferable.

As the ester compound, esters of monobasic and polybasic carboxylic acids including aliphatic carboxylic esters, olefinic carboxylic esters, alicyclic carboxylic esters and aromatic carboxylic esters can be used. More concretely speaking, their preferable examples include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, dipropyl phthalate, diisopropyl phthalate, dibutyl phthalate, diisobutyl phthalate, diheptyl phthalate, dioctyl phthalate, diphenyl phthalate and the like.

Among these ester compounds, olefinic carboxylic esters such as methacrylic esters and maleic ester and phthalic esters are preferable, and phthalic diethers are particularly preferable.

The organoaluminum compound used as component (B) in combination with the above-mentioned solid catalyst component is that having at least one aluminum-carbon bond in molecule. Its typical examples are represented by the following general formulas:

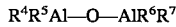

wherein $R^3$, $R^4$, $R^5$, $R^6$ and $R^7$ each represents a hydrocarbon group having 1–8 carbon atoms, Y represents halogen, hydrogen or alkoxy group, and $\gamma$ represents a number satisfying $2 \leq \gamma \leq 3$.

Concrete examples of the organoaluminum compound include trialkylaluminums such as triethylaluminum, triisobutylaluminum, trihexylaluminum and the like; dialkylaluminum hydrides such as diethylaluminum hydride, diisobutylaluminum hydride and the like; dialkylaluminum halides such as diethylaluminum chloride and the like; mixtures of a trialkylaluminum and a dialkylaluminum halide; and alkylalumoxanes such as tetraethyldialumoxane, tetrabutyldialumoxane and the like.

Among these organoaluminum compounds, trialkylaluminums, mixtures of a trialkylaluminum and a dialkylaluminum halide, and alkylalumoxanes are preferable, and triethylaluminum, triisobutylaluminum, a mixture of triethylaluminum and diethylaluminum chloride, and tetraethyldialumoxane are particularly preferable.

When an olefin is homopolymerized or copolymerized in gas phase, the amount of the organoaluminum compound can be selected from a wide range such as 1 to 1,000 moles per mole of titanium atom in the solid catalyst component. Particularly preferably, its amount is in the range of 5 to 600 moles on the same basis as the above.

The process for subjecting a solid catalyst component prepared by immobilizing a catalyst component comprising at least titanium, magnesium, halogen and an electron-donative compound on a porous polymer material to a preliminary polymerization treatment is carried out by contacting it with an organoaluminum compound and ethylene. The organoaluminum compound used herein can appropriately be selected from the above-mentioned organoaluminum compounds usable for olefin polymerizations. It is also possible to carry out the process in the presence of an electron-donative compound or hydrogen in order to regulate the molecular weight of preliminary polymer. An organometal such as diethylzinc or the like may also be used as a chain transfer agent, and a small quantity of α-olefin may also be used.

The process for subjecting the solid catalyst component of this invention to a preliminary polymerization treatment is preferably carried out in a slurry state. As the solvent which can be used for formation of the slurry, aliphatic hydrocarbons such as butane, pentane, hexane, heptane and the like and aromatic hydrocarbons such as toluene, xylene and the like can be referred to. Concentration of the slurry is 0.001 to 0.5 g solid/ml solvent, and particularly preferably 0.01 to 0.3 g solid/ml solvent.

Preferably, the agitation in the polymerization reactor is carried out in a state of allowing the particles to float. In other words, the speed of agitation is preferably not lower than the critical flotation speed of particles. If the speed of agitation is too low, a mutual adhesion of particles takes place. The amount of the organoaluminum compound used in the preliminary polymerization is an amount giving an Al/Ti molar ratio of 0.1 to 100, preferably 1 to 50 and particularly preferably 1 to 10 at the time of preliminary polymerization.

The quantity of ethylene in the preliminary polymerization is preferably 50 to 200 g, particularly preferably 60 to 150 g, per gram of the component immobilized on the porous polymer material (immobilized component). If the quantity of ethylene in the preliminary polymerization is too small, the formation of bulky polymer at the time of gas phase polymerization is difficult to prevent. If the quantity of ethylene in the preliminary polymerization is too great, the size of preliminary polymerization reactor increases to bring about an economical disadvantage. The preliminary polymerization must be carried out at a rate of at most 3 g/g-immobilized component/hour and particularly preferably at a rate of 0.3 to 3.0 g/g-immobilized component/hour, until the quantity of preliminary polymerization reaches at least 5 grams. If this initial quantity of preliminary polymerization is too small, it is difficult to obtain a powder of high bulk density and good fluidity in the step of gas phase polymerization. If the rate of preliminary polymerization is too high, a powder high in bulk density and good in fluidity cannot be obtained.

After carrying out an initial stage of preliminary polymerization in the manner mentioned above, the rate of the subsequent stages of the preliminary polymerization may be enhanced.

The rate of preliminary polymerization can be controlled by referring to the Al/Ti ratio at the time of preliminary polymerization, the amount of electron-donative compound, the temperature of preliminary polymerization, the feeding rate of ethylene into the preliminary polymerization reactor, etc. It is generally preferable to control the rate of preliminary polymerization by referring to the temperature and the feeding rate of ethylene.

The temperature of preliminary polymerization is preferably −30° C. to 80° C., and particularly −10° C. to 50° C. In the initial stage of preliminary polymerization, the temperature is particularly preferably −10° C. to 30° C.

The feeding rate of ethylene is preferably 0.1 to 100 g/g-immobilized component/hour, and particularly 0.3 to 30 g/g-immobilized component/hour. In the initial stage of the preliminary polymerization, the feeding rate is preferably at most 3 g/g-immobilized component/hour and particularly 0.3 to 3.0 g/g-immobilized component/hour, at least until the quantity of preliminary polymerization reaches 5 grams, as mentioned above.

Intrinsic viscosity $[\eta]$ of the preliminary polymer measured in tetralin at 135° C. must be in the range of 0.5 to 2.5 dl/g, and particularly preferably in the range of 1.0 to 2.3 dl/g. If $[\eta]$ is too high, fish-eyes appear when the polymer is processed into a film. Further, it causes the formation of fine powdery polymer, too.

For regulating the molecular weight of the preliminary polymer, a method of adding a chain transfer agent such as hydrogen, an organometal or the like, a method of controlling the temperature of preliminary polymerization, etc. can be referred to, among which the method of adding hydrogen is preferred. The addition of hydrogen may be carried out by any methods selected from a method of adding hydrogen in one portion before feeding ethylene, a method of adding hydrogen at a controlled flow rate in parallel with feeding ethylene, a method of adding an additional quantity of hydrogen just before changing the feeding rate of ethylene (this method is adopted when feeding rate of ethylene is changed in the halfway), and the like. The hydrogen is added while controlling the partial pressure of hydrogen so as to give a 0.1 to 10 times, particularly 0.5 to 5 times, hydrogen pressure based on the partial pressure of ethylene at the time of preliminary polymerization.

This invention proposes a process for producing olefin polymers which comprises homopolymerizing or copolymerizing an olefin in gas phase by the use of a catalyst system comprising the above-mentioned solid catalyst component having been subjected to a preliminary polymerization treatment with ethylene and the organoaluminum compound.

Hereunder, a more concrete embodiment of the polyemrization of lefin will be described.

The method for feeding each of the catalyst components into a polymerization reactor is not particularly critical, so far as they are fed in a water-free state in the presence of an inert gas such as nitrogen, argon or the like or hydrogen, ethylene, propylene or the like. The solid catalyst component having been subjected to preliminary polymerization treatment and the organoaluminum compound may be fed either separately or after a previous mutual contact.

The conditions of polymerization of an olefin are as follows. Thus, the polymerization is preferably carried out at a temperature which is lower than a melting temperature of polymer, preferably at 20° C. to 105° C. and particularly preferably 40° C. to 95° C., at a pressure ranging from ordinary pressure to 40 kg/cm$^2$, under conditions not allowing liquefaction of the monomer. In case of copolymerization, hydrogen is preferably added as a molecular weight regulator in order to regulate the melt-fluidity of the final product. An inert gas may be added to the gas mixture at the time of polymerization, though addition of the inert gas in an excessive proportion lowers productivity of the polymer.

Next, the olefins usable in this invention are those having 2 or more carbon atoms. Concrete examples of the olefin include ethylene, propylene, butene-1, pentene-1, hexene-1, 3-methyl-pentene-1, 4-methyl-pentene- 1 and the like, though this invention is by no means limited by these compounds. In the polymerization of olefins according to this invention, both homopolymerization and copolymerization can be practiced. In carrying out a copolymerization, two or more kinds of olefins are mixed together and contacted with the catalyst, whereby a copolymer can be obtained. Further, a heteroblock copolymerization which is achieved by carrying out the polymerization in two or more steps is also practicable easily. The gas phase polymerization reactor used for practicing this invention is not particularly critical, but known agitation-mixing tank type reactor, fluidized bed type reactor, fluidized bed type reactor equipped with agitator, and the like can be used.

Next, the process of this invention will be explained in more detail by referring to the following examples. This invention is by no means limited by these examples.

The properties of polymers referred to in the examples were measured according to the following methods:

(1) Density was determined according to JIS K-6760.
(2) Melt index was measured according to JIS K-6760 at 190° C.
(3) Bulk density was determined according to JIS K-6721.
(4) Intrinsic viscosity $[\eta]$ was determined by dissolving a polymer in tetralin at 135° C. and measuring the viscosity with a viscometer.
(5) Particle size distribution of polymer powder was determined in the following manner. Thus, a powdery polymer was classified by means of JIS Standard Sieve having a mesh range of 0.125 to 1.68 mm. The polymer fractions remaining on the sieves were weighed, and their proportions to the total polymer weight were calculated, and the proportions of fractions were cumulated from the side of small-sized fractions.

EXAMPLE 1

(A) Synthesis of Solid Catalyst Component

After replacing the inner atmosphere of a reactor made of stainless steel, equipped with a stirrer and having a capacity of 200 liters with nitrogen gas, 9.0 kg of a styrene-divinylbenzene copolymer having a mean particle diameter of 38 µm and a pore volume (measured by means of porosimeter over a pore radius range of 100 to 5,000 Angstroms, hereinafter abbreviated to dVp) of 1.05 ml/g which had been dried at 80° C. under a reduced pressure for 30 minutes was charged into the reactor together with 45 liters of toluene, 0.315 liter (0.92 mole) of tetrabutoxytitanium and 3.6 liters (16 moles) of tetraethoxysilane, and the mixture was stirred at 30° C. for 2 hours.

Then, 8.1 liters of a solution of butylmagnesium chloride in diethyl ether (concentration: 2.0 moles/liter) was dropwise added thereto over a period of one hour, while maintaining the inner temperature of the reactor at 5° C. After dropping it, the resulting mixture was stirred first at 5° C. for 30 minutes and thereafter at 30° C. for 30 minutes. Then, the solid matter was separated from the liquid phase at room temperature and three times washed with each 72 liters portion of toluene. Then, 37 liters of toluene and 2.5 liters (9.3 moles) of diisobutyl phthalate were added and reacted at 95° C. for one hour.

After the reaction, the solid material was separated from the liquid phase and twice washed with each 72 liters portion of toluene. Then, 37 liters of toluene, 0.125 liter (0.74 mole) of butyl ether and 1.7 liters (15.5 moles) of titanium tetrachloride were added and reacted at 95° C. for 3 hours. After the reaction, the solid material was separated from the liquid phase and twice washed with each 72 liters portion of toluene. Further, the solid material was twice washed with each 72 liters portion of hexane and dried to obtain 11.0 kg of a brown-colored solid catalyst component. The solid catalyst component thus obtained contained 0.37% by weight of titanium atom, 4.3% by weight of magnesium atom and 1.6% by weight of phthalic ester.

(B) Preliminary Polymerization Treatment of the Solid Catalyst Component

After replacing the inner atmosphere of an autoclave having a capacity of 210 liters and equipped with a stirrer with nitrogen gas, 1.02 kg of the solid catalyst component obtained in (A), 64.7 liters of butane and 0.375 mole of triethylaluminum were charged into the autoclave. Then, temperature of the autoclave was adjusted to 5° C. and hydrogen was fed until the total pressure reached 3.5 kg/cm$^2$, after which ethylene was fed in an amount of 7.8 g at a rate of 2.6 g/g-immobilized component·hour per gram of the immobilized component on the porous polymer material. Then, hydrogen was additionally fed until the total pressure reached 6.8 kg/cm$^2$ and ethylene was additionally fed in an amount of 99 g at a rate of 16.7 g/g-immobilized component·hour per gram of the immobilized component on the porous polymer material. After completion of the reaction, butane was flushed. Thus, 19.1 kg of a catalyst having been subjected to an ethylene preliminary polymerization treatment (hereinafter simply referred to as "preliminarily polymerized catalyst") was obtained. This preliminarily polymerized catalyst contained 100 g/g-immobilized component of preliminarily polymerized ethylene, and its intrinsic viscosity [η] was 2.1.

(C) Polymerization

Using the preliminarily polymerized catalyst obtained above, a random copolymerization of ethylene and butene-1 was carried out in a continuous fluidized bed type gas phase polymerization apparatus.

Thus, after elevating the temperature of the polymerization reactor to 85° C., 60 kg of a polyethylene powder which had previously been dried under reduced pressure was charged as a dispersant. Then, a gas mixture of ethylene, butene-1 and hydrogen of which ethylene/butene-1/hydrogen molar ratio was adjusted to 67/27/6 was circulated at a pressure of 20 kg/cm$^2$ at a flow rate of 0.45 m/sec in the reactor. When the molar ratio of ethylene/butene-1/hydrogen deviated from the preset value, the molar ratio was corrected by adding an additional quantity of gas. Then, triethylaluminum and the above-mentioned preliminarily polymerized catalyst were fed into the reactor at flow rates of 8.2 mllimoles/hour and 66.5 g/hour, respectively, and a fluidized bed gas phase copolymerization of ethylene and butene-1 was continuously carried out for 24 hours. The results of the polymerization are shown in Table 1. The polymer thus obtained had good particle characteristics, and its adhesion to the wall of polymerization rector was scarcely noticeable.

(D) Observations of Fish-Eye

By means of a small-sized inflation processing machine, the polymer obtained in (C) was processed at 190° C. into a film having a thickness of 30 μm, and fish-eye in the film was visually examined. Thus, the number of fish-eyes having a diameter of 0.2 mm or above per square meter of the film was counted. As a result, its number was 36. This result means that there is no problem from the viewpoint of product specifications.

COMPARATIVE EXAMPLE 1

Using the solid catalyst component obtained in Example 1 (A), a polymerization was carried out in the same manner as in Example 1 (C), except that no preliminary polymerization was carried out. As a result, the inner temperature of the polymerization reactor violently raised, and therefore the polymerization had to be stopped in the early stage. After stop of the polymerization, a large-sized mass of polymer was found in the reactor.

COMPARATIVE EXAMPLE 2

(A) Preliminary Polymerization Treatment of the Solid Catalyst Component

After replacing the inner atmosphere of an autoclave having a capacity of 210 liters and equipped with a stirrer with nitrogen gas, 1.0 kg of the solid catalyst component obtained in Example 1 (A), 63.2 liters of butane and 0.375 mole of triethylaluminum were charged. Then, the temperature was adjusted to 5° C. and hydrogen was charged until the total pressure reached 3.5 kg/cm$^2$. Then, ethylene was fed in an amount of 1.4 g at a rate of 2.8 g/g-immobilized component·hour per gram of the immobilized component on the porous polymer material. Then, hydrogen was additionally fed until the total pressure reached 7.0 kg/cm$^2$, and ethylene was additionally fed in an amount of 110 g at a rate of 15 g/g-immobilized component. After completion of the reaction, butane was flushed. Thus, 20.0 kg of a preliminarily polymerized catalyst was obtained, on which 106 g/g-immobilized component of ethylene had been preliminarily polymerized.

(B) Polymerization

Using the preliminarily polymerized catalyst obtained above, a random copolymerization of ethylene and butene-1 was carried out in the same manner as in Example 1 (C). The results of polymerization are shown in Table 1. The polymer had a bulk density of 0.40 g/cm$^3$, which was lower than that in Example 1.

COMPARATIVE EXAMPLE 3

(A) Synthesis of Solid Catalyst Component

After replacing the inner atmosphere of a reactor made of stainless steel, having a capacity of 200 liters and equipped with a stirrer with nitrogen gas, 80 liters of hexane, 1.8 liters (5.3 moles) of tetrabutoxytitanium and 22 liters (99 moles) of tetraethoxysilane were charged into the reactor, made into a uniform solution and stirred at room temperature for 30 minutes. Then, 53 liters of a solution of butylmagnesium chloride in butyl ether (concentration: 2.0 moles/liter) was slowly dropped thereinto over a period of 3.5 hours, while maintaining the inner temperature at 5° C. After dropping it, the mixture was stirred at room temperature for an additional one hour. The solid material was separated from the liquid phase at room temperature and three times washed with each 70 liters portion of toluene.

Then, 80 liters of toluene and 10 liters (37 moles) of diisobutyl phthalate were added to the solid material and reacted at 95° C. for one hour.

After the reaction, the solid matter was separated from the liquid phase and twice washed with each 70 liters portion of toluene.

After washing the solid matter, it was charged in the reactor and, 80-liters of toluene, 1.5 liters (8.9 moles) of butyl ether, 0.8 liter (3.0 moles) of diisobutyl phthalate and 30 liters (273 moles) of titanium tetrachloride were added thereto and reacted at 95° C. for 3 hours. After completion of the reaction, the solid matter was separated from the liquid phase at 95° C. and twice washed with each 70 liters portion of toluene.

After washing the solid matter, it was charged in the reactor, and 80 liters of toluene, 1.5 liters (11.6 moles) of butyl ether, 0.8 liter (3.0 moles) of diisobutyl phthalate and 15 liters (136 moles) of titanium tetrachloride were added thereto and reacted at 95° C. for one hour. After completion of the reaction, the solid matter was separated from the liquid phase and twice washed at that temperature with each 70 liters portion of toluene. It was further washed twice with each 70 liters portion of n-hexane and dried to obtain 12.6 kg of a brown-colored solid catalyst component.

The solid catalyst component thus obtained contained 2.1% by weight of titanium atom, 21% by weight of magnesium atom and 6.3.% by weight of phthalic ester.

(B) Preliminary Polymerization Treatment of the Solid Catalyst Component

The solid catalyst component (0.50 kg) obtained above was treated in the same manner as in Example 1 (B), except that 0.635 mole of triethylaluminum was used. Thus, 9.4 kg of a preliminarily polymerized catalyst was obtained.

(C) Polymerization

Using the preliminarily polymerized catalyst obtained above, a polymerization was carried out in the same manner as in Example 1 (C). As a result, the inner temperature of the reactor raised violently and therefore the polymerization had to be stopped in the early stage. After stopping the reaction, a large bulky mass of polymer was found in the reactor.

EXAMPLE 2

(A) Preliminary Polymerization Treatment of the Solid Catalyst Component

After replacing the inner atmosphere of an autoclave having a capacity of 210 liters and equipped with a stirrer with nitrogen gas, 1.0 kg of the catalyst component obtained in Example 1 (A), 63.2 liters of butane and 0.366 mole of triethylaluminum were charged therein The temperature was adjusted to 5° C. hydrogen was fed until the total pressure reached 3.5 kg/cm$^2$, and then ethylene was fed in an amount of 9.3 g at a rate of 2.9 g/g-immobilized component·hour per gram of the immobilized component on the porous polymer material. Further, hydrogen was fed until the total pressure reached 7.0 kg/cm$^2$ and then ethylene was fed in an amount of 46.6 g at a rate of 13.3 g/g-immobilized component·hour per gram of the immobilized component on the porous polymer material. After the reaction, butane was flushed to obtain 10.0 kg of a preliminarily polymerized catalyst. On this catalyst, 52.3 g/g-immobilized component of ethylene had been preliminarily polymerized, and its intrinsic viscosity [η] was 2.2.

(B) Polymerization

Using the preliminarily polymerized catalyst obtained above, a random copolymerization of ethylene and butene-1 was carried out in the same manner as in Example 1 (C). As a result, the catalytic activity was 2,840,000 g-polymer/g-titanium atom. The polymer obtained herein had a density of 0.920. Its MFR was 1.69 g/10 min., and its bulk density was 0.47 g/cm$^3$. The polymer powder had a nearly spherical shape, and had a good fluidity with a narrow particle size distribution. Fine polymer powder having a size of less than 125 μm was not formed at all.

EXAMPLE 3

(A) Preliminary Polymerization Treatment of Solid Catalyst Component

After replacing the inner atmosphere of an autoclave having a capacity of 210 liters and equipped with a stirrer with nitrogen gas, 1.0 kg of the catalyst component obtained in Example 1 (A), 63.2 liters of butane and 0.375 mole of triethylaluminum were charged therein The temperature was adjusted to 5° C. hydrogen was fed until the total pressure reached 3.5 kg/cm$^2$, and then ethylene was fed in an amount of 58 g at a rate of 2.8 g/g-immobilized component·hour. After completion of the reaction, butane was flushed to obtain 10.4 kg of a preliminarily polymerized catalyst. Thus, 50.1 g/g-immobilized component of ethylene was preliminarily polymerized, and its intrinsic viscosity [η] was 2.3.

(B) Polymerization

Using the preliminarily polymerized catalyst obtained above, a random copolymerization of ethylene and butene-1 was carried out in the same manner as in Example 1 (C). As a result, the catalytic activity was 2,360,000 g-polymer/g-titanium atom. Density of the polymer obtained herein was 0.919, its MFR was 1.20 g/10 min., and its bulk density was 0.49 g/cm$^3$. The polymer powder had a nearly spherical shape, and it was good in fluidity with a narrow molecular weight distribution. Fine polymer having a size of 125 μm or under was not formed at all.

EXAMPLE 4

(A) Preliminary Polymerization Treatment of Solid Catalyst Component

After replacing the inner atmosphere of an autoclave having a capacity of 210 liters and equipped with a stirrer with nitrogen gas, 1.0 kg of the solid catalyst component obtained in Example 1 (A), 63.2 liters of butane and 0.366 mole of triethylaluminum were charged therein The temperature was adjusted to 5° C. hydrogen was fed until the total pressure reached 6.0 kg/cm$^2$, and then ethylene was fed in an amount of 42 g at a rate of 2.8 g/g-immobilized component·hour. Then, hydrogen was added until the total pressure reached 13.0 kg/cm$^2$, and ethylene was fed in an amount of 97 g at a rate of 15.8 g/g-immobilized component·hour. After completion of the reaction, butane was flushed to obtain 19.1 kg of a preliminarily polymerized catalyst. Thus, 101 g/g-immobilized component of ethylene was preliminarily polymerized, and its intrinsic viscosity [η] was 1.4.

(B) Polymerization

Using the preliminarily polymerized catalyst obtained above, a random copolymerization of ethylene and butene-1 was carried out in the same manner as in Example 1 (C). As a result, the catalytic activity was 2,080,000 g-polymer/g-titanium atom. Density of the polymer obtained herein was 0.921, its MFR was 1.50 g/10 min., and its bulk density was 0.49 g/cm$^3$. The polymer powder had a nearly spherical shape, and it was good in fluidity with a narrow molecular weight distribution. Fine polymer having a size of less than 125 μm was not formed at all.

EXAMPLE 5

(A) Preliminary Polymerization Treatment of Solid Catalyst

After replacing the inner atmosphere of an autoclave having a capacity of 210 liters and equipped with a stirrer with nitrogen gas, 1.0 kg of the solid catalyst component obtained in Example 1 (A), 63.2 liters of butane and 0.395 mole of triethylaluminum were charged therein. The temperature was adjusted to 5° C. hydrogen was fed until the total pressure reached 1.5 kg/cm$^2$, and then ethylene was fed in an amount of 42 g at a rate of 2.8 g/g-immobilized component·hour. Then, hydrogen was added until the total pressure reached 8.5 kg/cm$^2$, and ethylene was fed in an amount of 90 g at a rate of 15.0 g/g-immobilized component·hour. After completion of the reaction, butane was flushed to obtain 17.7 kg of a preliminarily polymerized catalyst. Thus, 93 g/g-immobilized component of ethylene was preliminarily polymerized, and its intrinsic viscosity [η] was 1.8.

(B) Polymerization

Using the preliminarily polymerized catalyst obtained above, a random copolymerization of ethylene and butene-1 was carried out in the same manner as in Example 1 (C). As a result, the catalytic activity was 2,410,000 g-polymer/g-titanium atom. Density of the polymer obtained herein was 0.919, its MFR was 0.72 g/10 min., and its bulk density was 0.48 g/cm$^3$. The polymer powder had a nearly spherical shape, and it was good in fluidity with a narrow molecular weight distribution. Fine polymer having a size of less than 125 μm was not formed at all.

COMPARATIVE EXAMPLE 4

(A) Prepliminary Polymerization Treatment of Solid Catalyst Component and Polymerization A preliminary polymerization and a polymerization were carried out by repeating the procedures of Example 2, except that no hydrogen was added at all in the procedure of Example 2 (A). As the result, bulk density of the polymer was 0.46 g/cm$^3$.

(B) Observation of Fish-Eye

The polymer obtained in (A) was processed into a film at 190° C. by means of a small-sized inflation processing machine to obtain a film having a thickness of 30 μm. Presence of fish-eye on this film was visually examined. Thus, the number of fish-eyes having a diameter of 0.2 mm or above per square meter of the film was counted. As the result, the number was 200, which was greater than in the above-mentioned examples of this invention.

According to this invention, an olefin polymer small in the extent of adhesion to polymerization reactor at the time of polymerization, small in the number of fish-eyes, low in the content of fine powder, high in bulk density and good in fluidity can be produced.

TABLE 1

| | Intrinsic viscosity of preliminary polymer (dl/g) | Catalytic activity (g-Polymer/ g-Ti atom) | Density (g/cm$^3$) | MFR (g/10 min.) | Bulk density (g/cm$^3$) | Count of fish-eyes (No./m$^2$) | Proportion of fine polymer having a size of less than 125 μm (% by wt) | Note |
|---|---|---|---|---|---|---|---|---|
| Example 1 | 2.1 | 2,580,000 | 0.920 | 1.12 | 0.48 | 36 | 0 | |
| Comparative Example 1 | — | Polymerization uncontinuable | → | → | → | → | → | Polymer mass formed |
| Comparative Example 2 | 2.3 | 1,880,000 | 0.920 | 0.91 | 0.40 | 29 | 0 | |
| Comparative Example 3 | | Polymerization uncontinuable | → | → | → | → | → | Polymer mass formed |
| Example 2 | 2.2 | 2,840,000 | 0.920 | 1.69 | 0.47 | 25 | 0 | |
| Example 3 | 2.3 | 2,360,000 | 0.919 | 1.20 | 0.49 | 21 | 0 | |
| Example 4 | 1.4 | 2,080,000 | 0.921 | 1.50 | 0.49 | 20 | 0 | |
| Example 5 | 1.8 | 2,410,000 | 0.919 | 0.72 | 0.48 | 46 | 0 | |
| Comparative Example 4 | Unmeasurable | 2,290,000 | 0.920 | 0.60 | 0.46 | 200 | 0.7 | |

What is claimed is:

1. A process for producing an olefin polymer which comprises homopolymerizing ethylene or copolymerizing ethylene and an α olefin in a gas phase using a catalyst system comprising the following components A) and B):

A) a solid catalyst component prepared by impregnating a catalyst component into a porous polymer material which is a trivalent titanium-containing solid catalyst component represented by the following composition formula:

$Mg_mTi(OR)_nX_p(ED)_q$ wherein R is a hydrocarbon group having 1–20 carbon atoms, X is a halogen, ED is an electron-donative compound, and m, n, p and q are numbers satisfying $1 \leq m \leq 51$, $0 \leq n \leq 5$, $5 \leq p \leq 106$ and $0.2 \leq q \leq 2$, respectively, said solid catalyst component being prepared by reducing a titanium compound represented by the following formula:

$Ti(OR^1)_aX_{4-a}$ wherein $R^1$ is a hydrocarbon group having 1–20 carbon atoms, X is a halogen atom and a is a number satisfying $0 < a \leq 4$, with an organomagnesium compound in the presence of an organic silicon compound having Si—O bond and a porous polymer to obtain a solid product, treating the solid product with an ester compound, and then reacting the treated product with titanium tetrachloride or a mixture of titanium tetrachloride and an electron-donative compound, said solid catalyst component satisfying the following conditions (a), (b) and (c):

(a) ethylene is preliminarily polymerized thereon in an amount of 50–200 g per gram of the component previously impregnated into the porous polymer material, (b) the preliminary polymerization of ethylene is carried out at most at a rate of 3 g/g-impregnated component•hour at least until the quantity of the preliminarily polymerized ethylene reaches 5 g/g-impregnated component, and (c) the preliminarily polymerized ethylene polymer has an intrinsic viscosity [η] of 0.5 dl/g to 2.5 dl/g as measured in tetralin at 135° C.; and (B) an organoaluminum compound.

2. A process according to claim 1, wherein the porous polymer material is polystyrene, polyvinyl chloride, polyolefin, or polyacrylonitrile.

3. A process according to claim 1, wherein the mean particle diameter of the porous polymer material is 5 to 300 μm.

4. A process according to claim 1, wherein the pore volume of the porous polymer material in the pore radius range of 100 to 5,000 Angstroms is 0.1 ml/g or above.

5. A process according to claim 1, wherein the atomic ratio of titanium/magnesium in the catalyst component is 0.02 to 1.0.

6. A process according to claim 1, wherein the molar ratio of halogen/magnesium in the catalyst component is 1.8 to 10.

7. A process according to claim 1, wherein the molar ratio of an electron-donative compound/titanium compound in the catalyst component is 0.1 to 5.

8. A process according to claim 1, wherein the quantity of the catalyst component to be impregnated on the porous polymer material is 1 to 70% by weight in the solid catalyst component.

9. A process according to claim 1, wherein the preliminary polymerization of ethylene on the solid catalyst component is carried out in a slurry state using a solvent at a temperature of −30° to 80° C.

10. A process according to claim 9, wherein the solvent is butane, pentane, hexane, heptane, toluene or xylene.

11. A process according to claim 9, wherein the concentration of the solid catalyst component in the slurry is 0.001 to 0.5 g solid/ml solvent.

12. A process according to claim 1, wherein the amount of organoaluminum compound used in the preliminary polymerization is an amount giving Al/Ti molar ratio of 0.1 to 100.

13. A process according to claim 1, wherein the homopolymerization or copolymerization of an olefin is carried out at a pressure ranging from atmospheric pressure to 40 $kg/cm^2$.

14. A process according to claim 1, wherein the olefin is propylene, butene-1, pentene-1, hexene-1, 3-methyl-pentene-1, or 4-methyl-pentene-1.

15. A process according to claim 1, wherein the organoaluminum compound (B) is triethylaluminum, triisobutylaluminum, a mixture of triethylaluminum and diethylaluminum chloride, or tetraethyldialuminoxane.

16. A process according to claim 1, wherein the amount of the organoaluminum compound is 1 to 1,000 moles per mole of titanium atom in the solid catalyst component.

17. A process according to claim 1, wherein the titanium compound represented by the formula $Ti(OR^1)_aX_{4-a}$ is ethoxytitanium trichloride, butoxytitanium trichloride, phenoxytitanium trichloride, dibutoxytitanium dichloride, diphenoxytitanium dichloride, tributoxytitanium chloride, tetraethoxytitanium, tetrabutoxytitanium or tetraphenoxytitanium.

18. A process according to claim 1, wherein the ester compound is an aliphatic carboxylic acid ester, an unsaturated carboxylic acid ester, an alicyclic carboxylic acid ester or an aromatic carboxylic acid ester.

19. A process according to claim 1, wherein the electron donative compound is an alcohol compound, an ester compound or an ether compound.

* * * * *